United States Patent Office 3,709,851
Patented Jan. 9, 1973

3,709,851
PREPARATION OF CIS-1,4-POLYISOPRENE
Kan Mori, Fumitake Imaizumi, Hisaya Sato, Isao Nagaoka, Shigetoshi Hirayanagi, Toru Shibata, and Shigeo Kawatani, Kanagawa-ken, Japan, assignors to Japan Synthetic Rubber Co., Ltd. (Nihon Gasei Gomu Kabushiki Kaisha), Tokyo, Japan
No Drawing. Filed Nov. 12, 1970, Ser. No. 89,144
Claims priority, application Japan, Nov. 21, 1969, 44/93,512
Int. Cl. C08d 1/28, 3/10
U.S. Cl. 260—94.3    12 Claims

ABSTRACT OF THE DISCLOSURE

High molecular weight cis-1,4-polyisoprene is produced by contacting isoprene with a catalyst comprising (A) a titanium tetrahalide, (B) an organo-aluminum compound represented by the general formula $AlR^1R^2R^3$ (wherein $R^1$ and $R^2$ which may be same or different, represent alkyl, aryl or cycloalkyl radical, and $R^3$ represents alkyl, aryl, cycloalkyl radical or hydrogen) and (C) a monohaloether represented by the general formula

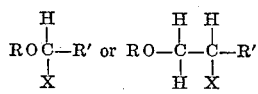

(wherein R represents alkyl, alkenyl, cycloalkyl or aryl radical, R' represents alkyl radical or hydrogen and X represents halogen).

The activity of this catalyst is not adversely affected by such impurities as cyclopentadiene that are contained in the isoprene feed stock.

---

The present invention relates to the polymerization of isoprene and more particularly, relates to the polymerization of isoprene with a catalyst on which impurities, particularly cyclopentadiene, in the isoprene monomer have minimal influence. It hs been generally experienced that when isoprene is polymerized in the presence of a Ziegler type catalyst composed of titanium tetrachloride and trialkyl aluminum to prepare cis-1,4-polyisoprene, the polymerization is inhibited to a large extent by the cyclopentadiene in the isoprene and thus only a low yield results. Therefore, for the commercial preparation using the Ziegler catalyst it is required that the impurity content in the isoprene monomer must be reduced considerably or a larger amount of the catalyst must be used. In either case, however, there arise disadvantages with respect to production costs.

Therefore, an object of the present invention is to provide an improvement in producing high molecular weight polyisoprene having a high percentage cis-1,4 addition.

Another object of the present invention is to provide a polymerization catalyst which has a very unique property in that it not only has the ability to effect the polymerization of pure isoprene at a high efficiency to yield, 1,4-cis-polyisoprene, but also, in that this ability is not particularly affected adversely by such impurities as cyclopentadiene which are usually present in commercial isoprene.

The present inventors investigated a polymerization catalyst which is not affected adversely by cyclopentadiene and provides a high molecular weight, cis-1,4-bond polyisoprene with a high yield, and have completed the present invention based on the conclusion that the above objects can be attained by using a ternary system catalyst comprising a titanium tetrahalide, an organo aluminum compound and a halogenated ether compound.

It is well known from the disclosures of, for example, Belgian Pat. No. 543,292 (1955), that the Ziegler catalyst consisting of titanium tetrachloride and trialkylaluminum catalyzes the formation of cis-1,4-polyisoprene from isoprene. However, in polymerizing isoprene in the presence of the Ziegler catalyst, the cyclopentadiene contained in the isoprene feed stock greatly impairs the polymerization activity of said catalyst. A cyclopentadiene content of less than 100 p.p.m., say, several tens of p.p.m., as shown in the hereinafter given control experiments, decreases the activity of the conventional Ziegler catalyst to a low value, such as, one-half to one-fourth that of its normal activity. On the other hand, the commercial isoprene that is presently being produced by various processes usually contains a substantial amount of cyclopentadiene as an impurity. Hence, heretofore, in producing cis-1,4-polyisoprene it was necessary to maintain the activity of the catalyst to reduce the cyclopentadiene content of the isoprene feed stock used to the order of not more than several p.p.m. by removing the cyclopentadiene in advance of the use of the isoprene feed stock in the polymerization process. However, to carry out the purification of isoprene to such a high degree, precise fractionation using a distillation column having a great number of theoretical plates or using special chemical treatments was necessary. It goes without saying that a purification treatment of this kind increases the cost of the feed stock isoprene and unfavorably affects the process economically.

In contrast, the catalyst of the present invention possesses the property that its activity does not demonstrate a marked decrease by the presence of cyclopentadiene in amounts up to about 100 p.p.m. Thus, even isoprene containing a considerable amount of cyclopentadiene, can be effectively used as the polymeric starting material after having reduced its cyclopentadiene content to an amount below 100 p.p.m. by means of the usual simple fraction distillation technique or other appropriate treatments. For example, as shown in the hereinafter given examples, the activity of the invention catalyst decreases only several percent even when impure isoprene containing 40 p.p.m. of cyclopentadiene is used instead of pure isoprene whose cyclopentadiene content is substantially zero p.p.m. Thus the catalyst of the present invention is fully satisfactory for practical use. The use of such inexpensive isoprene as the feed stock is of great significance from the standpoint of commercial economy.

The preparation of high molecular cis-1,4-polyisoprene according to the present invention comprises contacting isoprene with a ternary catalyst composed of (A) a titanium tetrahalide, (B) an organo aluminum compound of a general formula $AlR^1R^2R^3$ where each of $R^1$ and $R^2$ is an alkyl, aryl or cycloalkyl radical and $R^3$ is an alkyl, aryl, cycloalkyl radical, or hydrogen and (C) a monohaloether compound of the general formula:

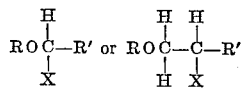

wherein R is an alkyl, alkenyl, cycloalkyl or aryl radical, R' is hydrogen or an alkyl radical and X is halogen.

Suitable titanium tetrahalides for use as component (A) of the present inventive catalyst includes titanium tetrachloride, titanium tetrabromide and titanium tetraiodide. Among them titanium tetrachloride is most preferable.

Suitable organo aluminum compounds for use as component (B) of the catalyst include compounds represented by a general formula $AlR^1R^2R^3$ wherein each of $R^1$ and $R^2$ represents an alkyl, aryl or cycloalkyl radical, and $R^3$ represents an alkyl, aryl or cycloalkyl radical, or hydrogen. The most preferred organo aluminum compounds are aluminum tri-alkyls $Al(R^4)_3$ wherein each $R^4$ is an alkyl such as ethyl, propyl, butyl, isobutyl, amyl, hexyl, octyl, etc., and their representative examples are: trimethyl aluminum, triethyl aluminum, tripropyl aluminum, triisobutyl aluminum, trihexyl aluminum and trioctyl aluminum.

Suitable halogenated ethers for use as component (C) of the present inventive catalyst includes α-haloethers of the general formula

wherein R is an alkyl, alkenyl, cycloalkyl or aryl group, R' is a hydrogen atom or an alkyl group and X is a halogen atom (chlorine, bromine or iodine), and β-haloether of the general formula

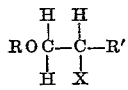

wherein R, R' and X have the same meaning as in the α-haloethers.

Examples of the halogenated ethers used in this invention are monochloromethyl methyl ether, monobromodimethyl ether, monoiododimethyl ether, chloromethyl ethyl ether, bromomethyl ethyl ether, iodomethyl ethyl ether, chloromethylpropyl ether, iodomethyl propyl ether, chloromethyl isopropyl ether, chloromethyl butyl ether, chloromethyl isobutyl ether, chloromethyl isoamyl ether, chloromethyl hexyl ether, chloromethyl octyl ether, β-chloroethyl phenyl ether, β-bromoethyl phenyl ether, β-iodoethyl phenyl ether and β-chloroethyl vinyl ether.

The most characteristic component of the invention catalyst is the monohaloether, component (C). It was truly surprising as well as unexpected that this monohaloether component when used conjointly with a titanium tetrahalide, the component (A), and an organoaluminum compound the component (B), would provide a high polymerization activity in polymerizing isoprene and, in addition, have the property that the activity of the catalyst would not be adversely affected by the impurity, cyclopentadiene. This effect cannot be obtained by other ether compounds such as ethers not containing halogen or di-haloethers.

According to British patent specification 870,010, a non-polymerizable ether is used as a catalyst activator and modifier in the polymerization of isoprene with a catalyst composed of a titanium tetrahalide and an organo aluminum compound, and the use of di-haloethers such as bis-(chloromethyl) ether and bis-(beta-chloroethyl) ether is suggested as the non-polymerizable ether. However in case of such di-halo-ethers, substantially no polymerization activity is assured even when 40 p.p.m. of cyclopentadiene are present and no polymer is obtained when 60 p.p.m. of cyclopentadiene are present, as shown in the reference examples 16–21. When ethers not containing halogen are used as component (C), only an extremely low yield of polyisoprene is obtained even though the isoprene contains substantially no cyclopentadiene.

Thus the advantage of the monohalo-ether catalyst according to the present invention is very remarkable.

Further, the activity of the catalyst which uses an alcohol, e.g. ethanol or octyl alcohol, as a modifier of the organo aluminum component of the Ziegler catalysts, decreases to a value one-fourth to one-third of the initial value even when the amount present of the cyclopentadiene is 30 p.p.m. These results will be shown in the hereinafter given reference experiments.

The catalyst of the present invention can be prepared by mixing the three components (A), (B) and (C) described above in an adequate organic solvent, desirably hydrocarbon solvents such as, for example, benzene, toluene, exane, heptane and cyclohexane. Although there is no specific limitation in the order of addition by which the three components of the catalyst are mixed together, usually the component (A) is added to a mixture of the components (B) and (C).

As for the proportions of three components to each other, the molar ratio of the component (C) to the component (B) may be 0.01 to 1.0, preferably 0.05 to 0.85. If the content of the component (C) is lower than 0.01, the desired results of the present invention are not obtained, while if the content is higher than 1.0 the catalyst activity lowers. The molar ratio of the component (B) to the component (A) may be 0.5 to 2.0, and preferably 0.9 to 1.5: if the ratio of (B) to (A) is out of this range, the catalyst activity lowers.

The polymerization is performed without solvent or in an adequate organic solvent either by mixing the components of the catalyst in the presence of the monomer, or by adding the monomer to a mixture of the catalyst components.

Suitable organic solvents used in this invention include hydrocarbon solvents, such as, aromatic hydrocarbon for example benzene, and toluene, aliphatic hydrocarbons, such as, pentane, hexane and heptane and alicyclic hydrocarbons, such as, cyclohexane.

As for the polymerization temperature in the present invention, these is also no particular limitation, but usually a temperature between −40° C. to 80° C. is selected.

Polyisoprene obtained using the catalyst of this invention is a high molecular weight cis-1,4-polymer, of which the inherent viscosity $[\eta]$ (in toluene at 30° C.) is usually 3 to 7, and contains about 93% of cis-1,4-configuration.

The invention will now be described with reference to several specific examples which are intended as illustrative only.

EXAMPLES 1 TO 5

These examples are intended to elucidate the relation between the amount of cyclopentadiene and the yield of polymer.

In a nitrogen-filled flask containing a Teflon rotor, were placed 12 ml. of a toluene solution of triethyl aluminum at a concentration of 0.5 mol/liter. While the solution was stirred at 0° C., 3.6 ml. of a 0.5 mol/liter toluene solution of monochlorodimethyl ether was added and the mixture was allowed to react for 10 minutes at 10° C. The reaction solution was cooled to −40° C., then 10 ml. of a 0.5 mol/liter toluene solution of titanium tetrachloride was added and the whole mixture was stirred for 60 minutes at 10° C. to prepare the catalyst. All the manipulations and the reactions were conducted under a nitrogen atmosphere. Subsequently, 160 ml. of dehydrated and deoxygenated hexane, 40 ml. of isoprene (27.2 g.) and a predetermined amount of a 0.548 g./liter hexane solution of cyclopentadiene were placed in a nitrogen-filled, pressure-proof 300 ml. glass reactor content, then 2.0 ml. of the above prepared solution of catalyst (molar ratio of isoprene to titanium was 1000) was added to it, the reactor was sealed and followed by a polymerization reaction for 5 hours under shaking in a 20° C. bath.

After a predetermined time, isopropyl alcohol containing 2,6-di-tert-butyl-p-cresol as antioxidant was added to stop the reaction and then the whole mixture was poured into a large amount of methanol under stirring in order to solidify the formed polymer. The product was washed with methanol and dried overnight in vacuum at 45° C. The results are shown in Table 1.

TABLE 1

| Number of example | Cyclopentadiene (p.p.m.) | Yield (percent) |
|---|---|---|
| 1 | 0 | 95 |
| 2 | 20 | 95 |
| 3 | 40 | 93 |
| 4 | 60 | 86 |
| 5 | 80 | 78 |

REFERENCE EXAMPLES 6 TO 9

These examples are intended to illustrate the influence of the ratio of monochlorodimethyl ether to triethyl aluminum on catalyst activity and inherent viscosity of the polymer under the same molar ratio of triethyl aluminum to titanium tetrachloride (B/A=1.2) as in Example 1.

In a nitrogen-filled 5 liter vessel for polymerization, 2400 ml. of dehydrated and deoxygenated n-hexane and 408 g. (6 mol) of isoprene were placed. In this mixture 30.6 ml. of a solution of the catalyst was added in which the ratio of monochlorodimethyl ether to triethyl aluminum was adjusted as predetermined (the ratio of isoprene to titanium was 1,000) in the same way as in Example 1. This mixture was allowed to react for 5 hours at 10° C., and the resulting matter was solidified and dried. The results are shown in Table 2.

TABLE 2

| Number of example | CME¹ AlEt₃ | Yield (percent) | $[\eta]^2$ |
|---|---|---|---|
| 6 | 0.3 | 98 | 5.2 |
| 7 | 0.5 | 94 | 5.7 |
| 8 | 0.7 | 91 | 5.4 |
| 9 | 0.8 | 72 | 5.5 |

¹ CME: Monochlorodimethyl ether.  ² In toluene, 30° C.

EXAMPLES 10 TO 15

These examples employ various halogenated ethers in place of the monochlorodimethyl ether of Example 1 and triisobutyl aluminum in place of triethyl aluminum. The conditions under which the catalyst was prepared and the polymerization was carried out were the same as in Example 1, unless otherwise mentioned. Results of the polymerization are shown in Table 3.

TABLE 3

| Example | Halogenated ether | —AlR₃ | Temperature of polymerization (° C.) | Yield (percent) | $[\eta]$ |
|---|---|---|---|---|---|
| 10 | Chloromethyl ethyl ether | AlEt₃ | 20 | 100 | 4.7 |
| 11 | β-Chloroethyl phenyl ether | AlEt₃ | 20 | 77 | 5.3 |
| 12 | β-Chloroethyl vinyl ether | AlEt₃ | 20 | 70 | |
| 13 | Monochlorodimethyl ether | Al(i-Bu)₃ | 50 | 92 | 3.8 |
| 14 | Chloromethyl phenyl ether | Al(i-Bu)₃ | 50 | 85 | 4.0 |
| 15 | β-Chloroethylphenyl ether | Al(i-Bu)₃ | 50 | 88 | 3.7 |

REFERENCE EXAMPLES 1 TO 5

These examples illustrate the resistance against cyclopentadiene of various substances in comparison with that of the present catalyst. In the reference examples 2 to 5, the same procedure as in Example 1 was followed except using acetone, acetonine, ethanol and n-octanol, respectively, instead of the monochlorodimethyl ether of Example 1. Reference Example 1 did not employ the third component and the ratio 1.0 was chosen for Al/Ti (in molar ratio) so as to exhibit the highest activity of this catalyst, while the other conditions were the same as in Example 1. Results are shown in Table 4.

TABLE 4

| Reference examples | Catalyst | Yield (percent) cyclopentadiene 0 p.p.m. | 30 p.p.m. | 40 p.p.m. |
|---|---|---|---|---|
| 1 | TiCl₄-AlEt₃ | 73 | | 41 |
| 2 | TiCl₄-AlEt₃-acetone | 82 | | 41 |
| 3 | TiCl₄-AlEt₃-acetonine | 75 | | 28 |
| 4 | TiCl₄-AlEt₃-ethanol | 87 | 21 | |
| 5 | TiCl₄-AlEt₃-octanol | 95 | 32 | |

REFERENCE EXAMPLES 10 TO 15

These reference examples show that, when an ether not containing halogen is used for the third component of the catalyst, only a very low yield can be expected even if the isoprene does not contain cyclopentadiene. Thus, the monochlorodimethyl ether in Example 1 was replaced by methylether and anisole, and using isoprene that did not contain cyclopentadiene, the procedure consisting of the preparation of the catalyst, polymerization and the after-treatment was followed in the same manner as in Example 1. Results are shown in Table 5.

TABLE 5

| Reference examples | Ether/triethylaluminum | Molar ratio | Yield (percent) |
|---|---|---|---|
| 10 | Di-methylether | 0.1 | 26 |
| 11 | do | 0.3 | 13 |
| 12 | do | 0.7 | 3 |
| 13 | Anisole | 0.1 | 24 |
| 14 | do | 0.3 | 17 |
| 15 | do | 0.7 | 5 |

REFERENCE EXAMPLES 16 TO 21

In these reference examples, the monochlorodimethyl ether used in Example 1 was replaced by bischloromethyl ether or bis-(beta-chloroethyl) ether to show the relation between the cyclopentadiene content in isoprene and the yield of the polymer. The same conditions for preparing the catalysts and the polymerization as in Example 1 were followed unless otherwise mentioned. The results are shown in Table 6.

TABLE 6

| Reference examples | Halogenated ethers | Halogenated ether/ Al (molar ratio) | Cyclopentadiene (p.p.m.) | Yield (percent) |
|---|---|---|---|---|
| 16 | Bis-chloromethylether | 0.1 | 40 | 16 |
| 17 | do | 0.1 | 60 | 0 |
| 18 | do | 0.2 | 40 | 0 |
| 19 | Bis(beta-chloroethyl) ether | 0.1 | 30 | 7 |
| 20 | do | 0.1 | 40 | 0 |
| 21 | do | 0.2 | 40 | 0 |

EXAMPLES 16 TO 21

In these examples, various monochloro ethers as component (C) of the catalyst are used to show the relation between the cyclopentadiene content in isoprene and the yield of polymers.

More particularly, titanium tetrachloride was used as component (A), triethyl aluminum was used as component (B), and the various monochloroethers as set forth in Table 7 was used as component (C). The polymerization was done to obtain polyisoprene in a similar way as in Examples 1 and 4 except that the molar ratio of (B)/(A) was 1.15, the molar ratio of (C)/(B) was 0.2, the molar ratio of isoprene/(A) was 1000, and the polymerization was effected at 10° C. for five hours. The results are shown in Table 7.

TABLE 7

| Examples | Monochloro ethers | Yield of polymers (percent) Cyclopentadiene, 0 p.p.m. | Cyclopentadiene, 60 p.p.m. |
|---|---|---|---|
| 16 | Mono-chloromethyl methyl ether | 100 | 85 |
| 17 | Mono-chloromethyl ethyl ether | 100 | 85 |
| 18 | Mono-chloromethyl n-butyl ether | 100 | 86 |
| 19 | Mono-chloromethyl 1-methyl-propyl ether | 100 | 87 |
| 20 | Mono-chloromethyl 2-methyl-propyl ether | 100 | 88 |
| 21 | Mono-chloromethyl 2-ethylhexyl ether | 100 | 88 |

What is claimed is:

1. A process for preparing a high molecular weight cis-1,4-polyisoprene which comprises contacting isoprene containing between several to about 100 p.p.m. of cyclopentadiene with a polymerization catalyst comprising
    (A) a titanium tetrahalide,
    (B) an organo aluminum compound of the formula AlR¹R²R³ wherein each of R¹ and R² is selected from the group consisting of alkyl, cycloalkyl and aryl radicals, and R³ is selected from the group consisting of hydrogen, alkyl, cycloalkyl and aryl radicals, and
    (C) a monohaloether of the general formula

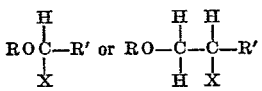

wherein R is selected from the group consisting of alkyl, alkenyl, cycloalkyl and aryl radicals, R' is selected from the group consisting of hydrogen or alkyl radical, and X is a halogen atom selected from the group consisting of chlorine, bromine and iodine.

2. The process according to claim 1, wherein the molar ratio of component (B) to component (A) is in the range from 0.5 to 2.0.

3. The process according to claim 1, wherein the molar ratio of component (C) to component (B) is in the range from 0.01 to 1.0.

4. The process according to claim 1, wherein component (A) is titanium tetrachloride.

5. The process according to claim 1, wherein component (B) is a trialkyl aluminum.

6. The process according to claim 1, wherein component (C) is a monochloroether.

7. The process according to claim 5, wherein the trialkyl aluminum is selected from the group consisting of trimethyl aluminum, triethyl aluminum, tripropyl aluminum, tributyl aluminum, trihexyl aluminum and trioctyl aluminum.

8. The process according to claim 6 wherein the monochloroether is selected from the group consisting of mono-chloromethyl methyl ether, mono-chloromethyl ethyl ether, mono-chloromethyl propyl ether, mono-chloromethyl butyl ether, mono-chloromethyl amyl ether, mono-chloromethyl hexyl ether, mono-chloromethyl octyl ether, β-chloromethyl phenyl ether and β-chloroethyl vinyl ether.

9. The process according to claim 2, wherein the molar ratio of component (B) to component (A) is in the range from 0.9 to 1.5.

10. The process according to claim 3 wherein the molar ratio of component (C) to component (B) is in the range from 0.05 to 0.85.

11. The process according to claim 1, wherein the polymerization reaction is carried out in a hydrocarbon solvent.

12. The process according to claim 1, wherein the polymerization reaction is carried out at a temperature from −40° C. to 80° C.

References Cited

UNITED STATES PATENTS 3,380,981   4/1968   Miller et al. -------- 260—93.7
3,423,387   1/1969   Sugiura et al. ------- 260—94.3

JAMES A. SEIDLECK, Primary Examiner

R. A. GAITHER, Assistant Examiner

U.S. Cl. X.R.

252—429 B; 260—82.1